(No Model.)
H. R. BROWN.
BAKING POWDER CAN AND MEASURE.
No. 523,195. Patented July 17, 1894.
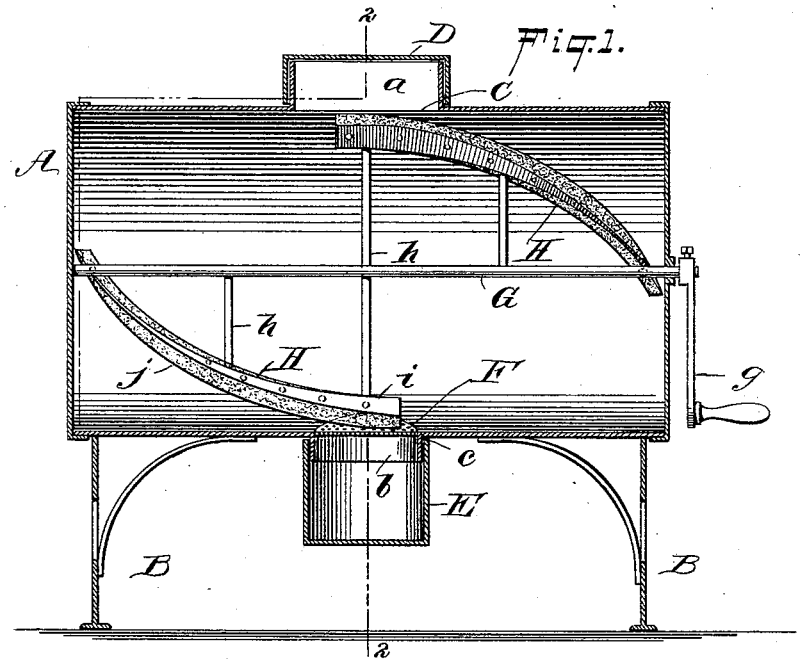
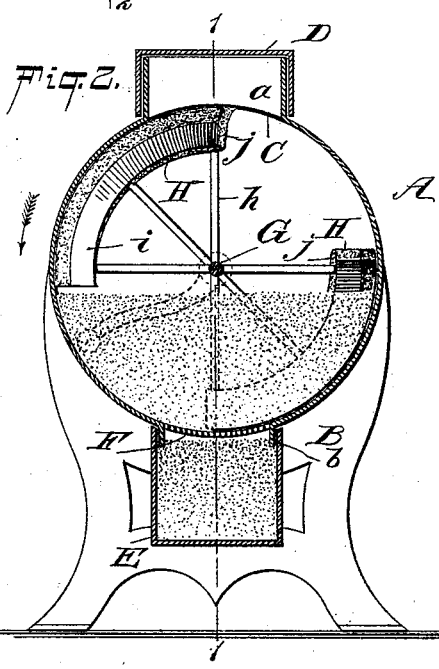
WITNESSES:
William Goebel.
C. Sedgwick.
INVENTOR
H. R. Brown
BY
Munn & Co
ATTORNEYS.

UNITED STATES PATENT OFFICE.

HENRY R. BROWN, OF GREENEVILLE, TENNESSEE.

BAKING-POWDER CAN AND MEASURE.

SPECIFICATION forming part of Letters Patent No. 523,195, dated July 17, 1894.

Application filed December 4, 1893. Serial No. 492,695. (No model.)

*To all whom it may concern:*

Be it known that I, HENRY R. BROWN, of Greeneville, in the county of Greene and State of Tennessee, have invented a new and Improved Baking-Powder Can and Measure, of which the following is a full, clear, and exact description.

The main object of the invention is to provide a utensil for individual use for preserving baking powder, having a measure arranged in connection with the outlet for measuring a predetermined quantity of the powder, and a novel means for mixing the powder each time a quantity is to be withdrawn, and for sifting and discharging the same into the measure.

The invention consists in the novel features hereinafter described and claimed.

Reference is to be had to the accompanying drawings, forming a part of this specification, in which similar letters of reference indicate corresponding parts in both the figures.

Figure 1 is a longitudinal vertical section of a baking powder can embodying my invention, on line 1—1 in Fig. 2; and Fig. 2 is a transverse section on the line 2—2 of Fig. 1.

In constructing a can or utensil in accordance with my invention, a cylindrical body A is provided, supported in the horizontal position by suitable legs B. At the top an inlet opening C is provided around which is a suitable neck $a$, and a cover or cap D fits over said neck, for closing the inlet, the ends of the cover, at the bottom edge, preferably following the curvature of the body A, for effecting a practically air tight closure.

Centrally of the body A, or approximately so, at the bottom, is an outlet having a neck $b$, and in connection with such outlet a measure E is employed for receiving a given quantity of the material, the measure at its ends $c$, following the curved line of the body. A sieve F of the desired mesh is secured at the outlet, the strainer being curved as shown, to follow the line of the body and arranged in the plane of the latter.

Centrally of the body A, a longitudinal shaft G is suitably journaled and provided with a crank handle $g$, or the like for turning it. On the shaft G, there are supported the spiral blades H, H, which contact with the interior surface of the body A, and act as brushes, each blade being supported from the shaft by arms $h$, and consisting of metallic plates $i$, $i$, and a strip $j$, of felt which is clamped between such plates. Brushes formed of bristles, may be employed, if desired. The blades H are arranged in a novel manner, in that they extend from near each end of the body A, in reverse directions and terminate at a point just beyond the center of the sieve F. With this arrangement it will be seen that the material will be forced back and forth across the central sieve, and be thoroughly mixed, and the blades will successively traverse the sieve and force out a quantity of the material until the measure E is filled. In this manner powder may be withdrawn as desired without undue exposure of that remaining, which is an important consideration with baking powder, and should the slight exposure due to removing and replacing the measure have any deleterious effect on the material immediately adjacent to the outlet, such material will be disseminated through the mass by turning of the blades, and caking will effectually be prevented.

Although the invention is especially adapted to baking powder, its usefulness is not limited to such material.

Having thus fully described my invention, I claim as new and desire to secure by Letters Patent—

The herein described utensil, comprising a horizontal cylindrical body having a suitable inlet, and provided with a central outlet opening in its bottom adapted to be closed by a measure, spiral brushes, supported on a horizontal shaft and contacting with the interior surface of the body, the said brushes extending from near each end of the body in reverse directions and terminating in line with the central outlet opening, a sieve located at the central outlet opening and curved to follow the line of the body, the said sieve being arranged in the path traversed by the inner ends or terminals of the brushes, and the inner end of one brush extending within the path traversed by the other, substantially as described.

HENRY R. BROWN.

Witnesses:
SAMUEL B. LA RUE,
CHARLES W. ALLEN.